US011641114B2

(12) United States Patent
Ginart et al.

(10) Patent No.: US 11,641,114 B2
(45) Date of Patent: *May 2, 2023

(54) USE OF THE UNUSED DURATION INJECTION UNITS IN AN ARRAY TO REDUCE OSCILLATIONS DURING IMPEDANCE INJECTION FOR CORRECTIONS OF PROBLEMS

(71) Applicant: Smart Wires Inc., Union City, CA (US)

(72) Inventors: Antonio Ginart, Los Angeles, CA (US); Michael T. Garrison Stuber, Newman Lake, WA (US); Haroon Inam, San Jose, CA (US); Shreesha Adiga Manoor, Milpitas, CA (US)

(73) Assignee: Smart Wires Inc., Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/735,914

(22) Filed: May 3, 2022

(65) Prior Publication Data

US 2022/0263318 A1 Aug. 18, 2022

Related U.S. Application Data

(63) Continuation of application No. 16/893,673, filed on Jun. 5, 2020, now Pat. No. 11,411,404.

(60) Provisional application No. 62/939,413, filed on Nov. 22, 2019.

(51) Int. Cl.
*H02J 3/36* (2006.01)
(52) U.S. Cl.
CPC .......... *H02J 3/36* (2013.01); *H02J 2003/365* (2013.01)

(58) Field of Classification Search
CPC .......... H02J 3/36; H02J 2003/365; H02J 3/20; H02J 13/00034; H02J 3/1814; H02J 3/01; H02J 3/002; H02J 13/00002; Y02E 40/70; Y04S 10/22
See application file for complete search history.

(56) References Cited

U.S. PATENT DOCUMENTS

| 5,198,746 A | 3/1993 | Gyugi et al. |
| 5,355,076 A * | 10/1994 | Chadwick ............. H02J 3/1807 363/39 |
| 5,424,627 A * | 6/1995 | Clark ........................ H02J 3/24 323/210 |
| 2011/0035065 A1 | 2/2011 | Schweitzer, III et al. |
| 2017/0163245 A1* | 6/2017 | Iyer ........................... H02J 3/26 |

OTHER PUBLICATIONS

Office Action dated Jul. 31, 2021; Indian Patent Application No. 202044044408; 6 pages total.

* cited by examiner

*Primary Examiner* — Toan T Vu
*Assistant Examiner* — Thai H Tran
(74) *Attorney, Agent, or Firm* — Womble Bond Dickinson (US) LLP

(57) ABSTRACT

A control module controls impedance injection units (IIUs) to form multiple connection configurations in sequence. Each connection configuration has one IIU, or multiple IIUs in series, parallel or combination of series and parallel. The connection configurations of IIUs are coupled to a high-voltage transmission line. The control module and the IIUs generate rectangular impedance injection waveforms. When the waveforms are combined and injected to the high-voltage transmission line, this produces a pseudo-sinusoidal waveform.

21 Claims, 9 Drawing Sheets

(a 2x2 IIU implementation of IIM)

A 4X2 IIU implementation of IIM

USE OF THE UNUSED DURATION INJECTION UNITS IN AN ARRAY TO REDUCE OSCILLATIONS DURING IMPEDANCE INJECTION FOR CORRECTIONS OF PROBLEMS

RELATED APPLICATIONS

This application is a continuation of U.S. patent application Ser. No. 16/893,673 filed Jun. 5, 2020, which claims benefit of priority from U.S. Provisional Application No. 62/939,413 filed Nov. 22, 2019, the disclosures of which are incorporated herein by reference.

TECHNICAL FIELD

The present disclosure relates to using available resources of transformerless flexible alternating current transmission system (TL-FACTS) based impedance injection units to manage disturbances on a high voltage (HV) transmission line.

BACKGROUND

The current move in the industry is to use modular transformerless flexible alternating current system (TL-FACTS) based impedance injection units (IIUs) for distributed and localized line balancing and localized control of disturbances in the high voltage (HV) transmission lines 108 of the grid, as shown in FIG. 1. This local control is in addition to utility-based control of power flow over the HV transmission lines. The local control of the HV transmission lines is achieved by use of intelligent impedance injection modules (IIMS) 300 connected in series with the transmission lines and comprise a number of IIUs typically connected in a series-parallel configuration. The parallel connected IIUs switched in synchronized fashion are used to provide increased current carrying capacity for the transmission lines while the series connected IIUs can be used to increase the injected impedance voltage in a cumulative fashion. The IIMs 300 are coupled to the HV transmission line 108, typically in a distributed fashion as shown in FIG. 1 to enable the local control. Since the IIMs 300 are connected in series with the HV transmission line 108, their injected impedance voltages are also cumulative over the HV transmission line 108. There is a need in the art for ongoing improvements.

SUMMARY

A method of operating impedance injection units (IIUs), an impedance injection unit system, and a computer-readable media are described in various embodiments.

One embodiment is a method of operating impedance injection units. The method includes controlling, by a control module, a plurality of IIUs to form multiple connection configurations in sequence. Each connection configuration includes one IIU, or multiple IIUs in series, parallel or combination thereof. Each connection configuration is coupled to a high voltage transmission line. The method includes generating a plurality of rectangular impedance injection waveforms. The generating is by the control module through the multiple connection configurations of IIUs in sequence. When the rectangular impedance injection waveforms are combined and injected to the high voltage transmission line, this produces a pseudo-sinusoidal waveform.

One embodiment is an impedance injection unit system. The system has a plurality of IIUs and a control module. The control module is to direct the plurality of IIUs to form connection configurations in sequence. Each connection configuration has one IIU or multiple IIUs in series, parallel or combination thereof, coupled to a high-voltage transmission line. The control module is to generate, through the connection configurations of IIUs in the sequence, rectangular impedance injection waveforms. The rectangular impedance injection waveforms are to combine and inject to the high voltage transmission line, to produce a pseudo-sinusoidal waveform on the high-voltage transmission line.

One embodiment is instructions on a tangible, non-transitory computer readable media. When the instructions are executed by a processor, this causes the processor to perform various actions. The processor is to direct a plurality of IIUs to form connection configurations in sequence, when the IIUs are coupled to a high-voltage transmission line. Each connection configuration includes one IIU or multiple IIUs in series, parallel or combination thereof. The processor is to generate, through the connection configurations of IIUs in the sequence, rectangular impedance injection waveforms. The rectangular impedance injection waveforms are to combine and inject to the high voltage transmission line, to produce a pseudo-sinusoidal waveform on the high-voltage transmission line.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

Embodiments of the disclosure are illustrated by way of example and not limitation in the figures of the accompanying drawings in which like references indicate similar elements.

NUMBERING AND LETTERS IN FIGURES

Figure 1:
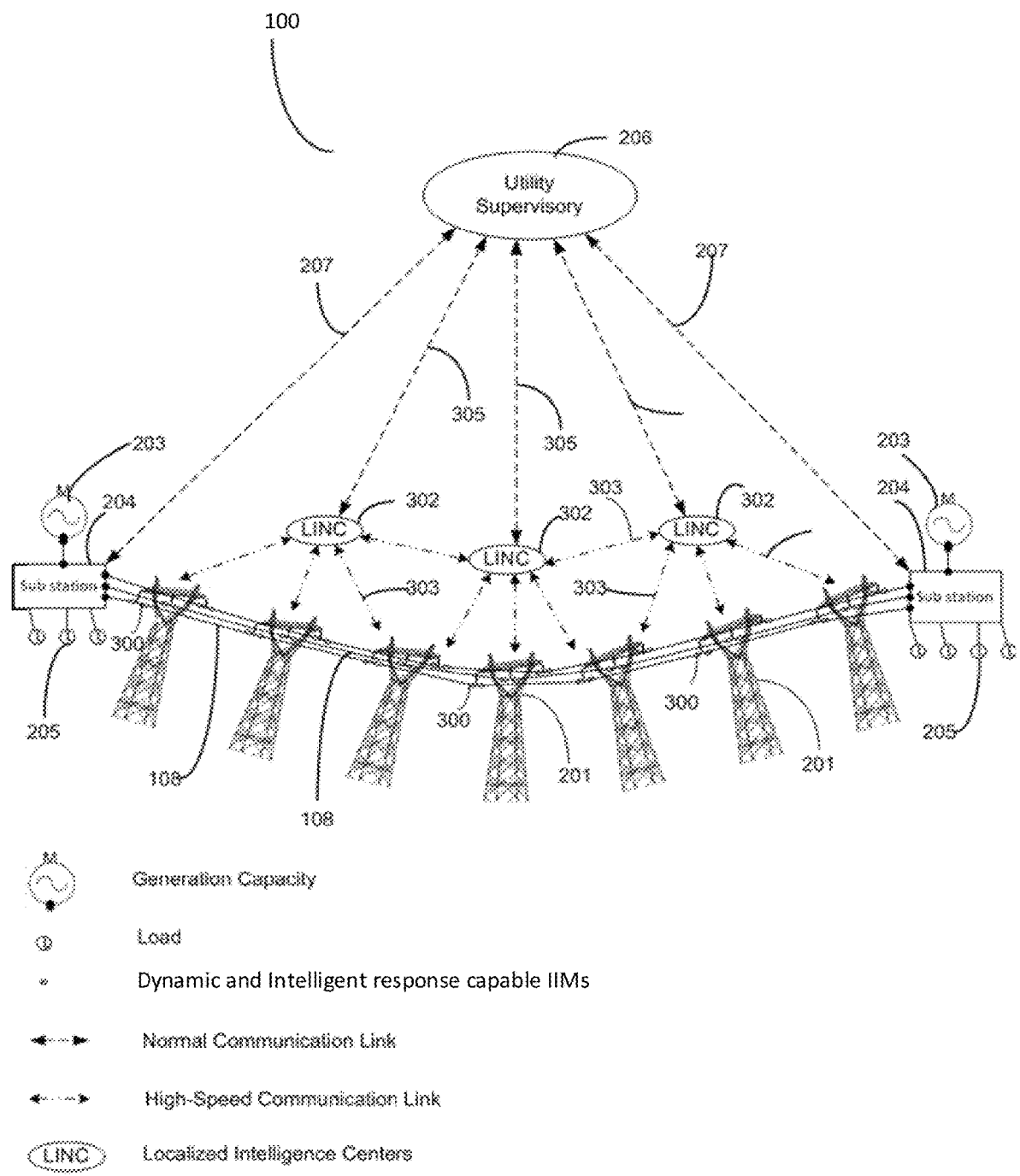
FIG. 1 is a diagram illustrating a conventional power grid system with a distributed and hierarchical intelligent control system. (prior art)

| | |
|---|---|
| 100- an example grid | 300- Impedance injection module (IIM) |
| 108- High voltage (HV) transmission line | 301-Sensor and power supply |
| 201- HV transmission towers | 302-Local Intelligence centers (LINC)s |
| 203-Generators | 303-High-speed communication link |
| 204- Substations | 304- Power supply & sensing Transformer |
| 205- Connected loads | 305- Communication link |
| 206- System utility | 400 A-v or B-v -square wave injection from IIU 400A or 400B |
| 207- Communication link | 401- Impedance injection unit |
| 408B-IGBT Switch | 402- Master Control--Intelligent with clock |
| 409- DC Capacitor | 403- Intelligent controller |
| 410- Highspeed wireless communication | 404A - Clock, synched to local clock |
| 500 - Generation of sinusoidal impedance injection | 404B- Clock, synched to global clock |
| 501 & 701- Smoothed injected waveform | 405- FACTS switch |
| 800- modifying the injected waveform | 406A & B- Injection terminals |
| 801-x-nv nth additional njection from IIU at free time. | 407- GPS satellite |
| 801- Modified impedance waveform | 408A-IGBT switch control |
| 400A & B series connected dual parallel switches 400-A1 & A2 and 400-B1 & B2 | 400A-v to 400B-v & injection from the series groups |
| 700-1 to 4 group of four dual parallel connected switched connected in series | 700-1v to 700-4v injected cumulative impedance voltages. |
| t1 to t4 -start times of the synchronized generated impedance waveforms | t1' to t4' - end times of the synchronized generated impedance waveforms |
| d1 to d4-duration of the synchronized generated impedance waveforms | s - the duration of short pulse waveform generated during unused period |

DETAILED DESCRIPTION

Intelligent impedance injection modules (IIMs) comprising connected transformer-less FACTS (TL-FACTS) devices are used as impedance injection units (IIUs) for control of high-voltage (HV) transmission lines. The IIUs generate and inject rectangular impedance waveforms which if cumulatively large when injected create high-frequency oscillations that interfere with control systems on the HV transmission lines and user premises. By staggering and synchronizing the timing of the injection from the series connected IIUs or IIU groups, the injected waveform is converted to a pseudo-sinusoidal waveform to reduce generation of oscillations. This method of injection leaves some IIUs or groups of IIUs with very low utilization. The idle time of the IIUs are used to generate and inject impedance on to the HV power line and modify the injected waveform to overcome unexpected disturbances when need arises.

Definitions

1. LOCAL: belonging or relating to a particular area or neighborhood, typically exclusively so. In this case the term local is used to denote a segment of the HV transmission typically line under a single local control.

2. IMPEDANCE: is the measure of the opposition that a circuit presents to a current when a voltage is applied. The term complex impedance may be used interchangeably. Impedance extends the concept of resistance to AC circuits, and possesses both magnitude and phase, Impedance can be inductive, capacitive, resistive.

FIG. 1 shows the example system 100 that includes distributed impedance injection modules (IIMs) 300 distributed over HV transmission lines 108 between substations 204. The IIMs 300 are directly attached to the HV transmission lines 108 of the power grid and are suspended insulated from ground on HV transmission lines suspended from HV towers 201. Generators 203 and loads 205 are typically connected to the HV transmission lines 108 of the power grid at the substations 204. The groups of local IIMs 300 are communicatively connected or coupled to a local intelligence center (LINC) 302 via high-speed communication links 303 that allow for communication and response by the IIMs 300 in the local area at sub-synchronous speeds when required. The plurality of LINCs 302 are also connected by high-speed communication links 303 to other neighboring LINCs 302 for coordination of activity of the local IIMs 300 groups. A supervisory utility 206 oversees the activity of the system 200A using command and communication links 207 connecting to the LINCs 302 and substations 204. The supervisory utility 206A is able to have interactive control of the local IIMs 300 via the communication links connecting it to the LINCs 302. The supervisory utility has superseding control of the LINCs 302 and the IIMs 300 at any time.

Figure 2:
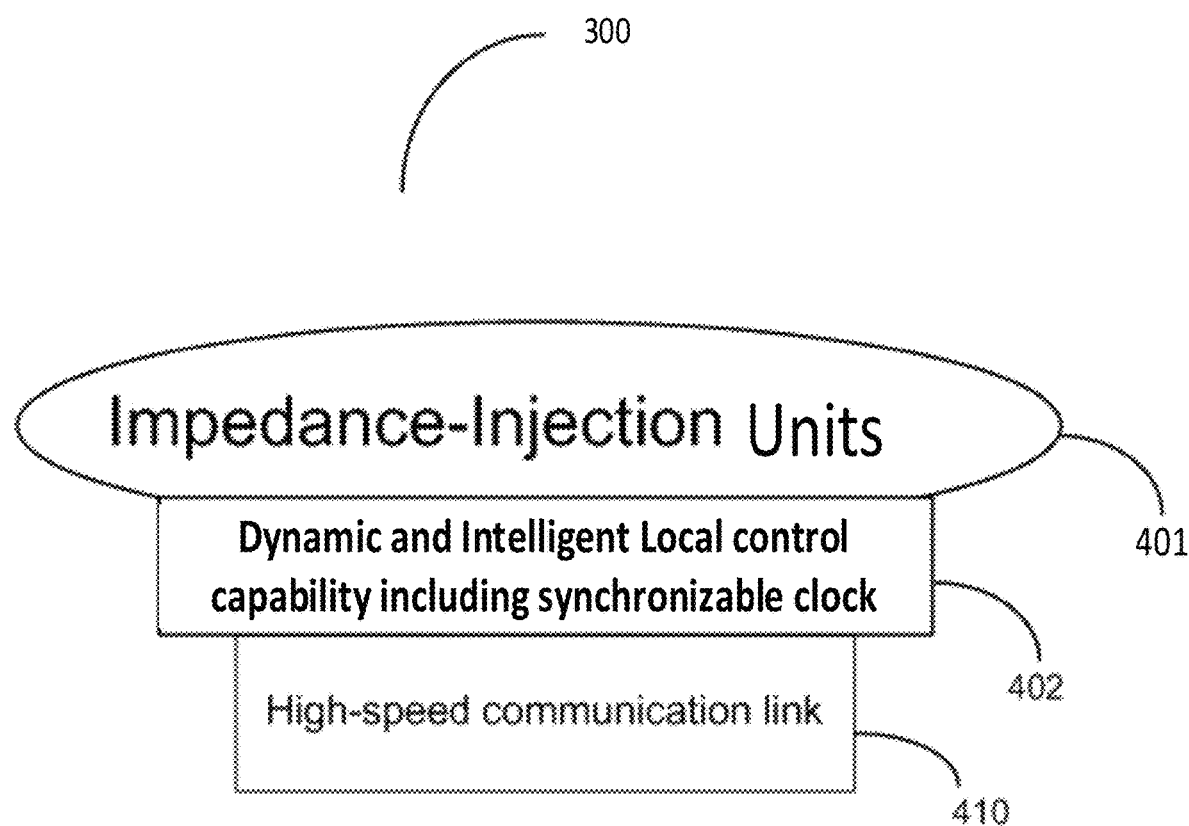
FIG. 2 is a block diagram illustrating a conventional dynamic intelligent impedance injection module with local and global time synchronization capability. (prior art)

FIG. 2 is a block diagram showing the main components of an intelligent IIM 300. Referring to FIG. 2, IIM 300 includes at least an impedance generation and injection module 401, an intelligent control capability 402 with at least a clock with time synchronization capability, and a high-speed communication link 410.

Figure 3A:
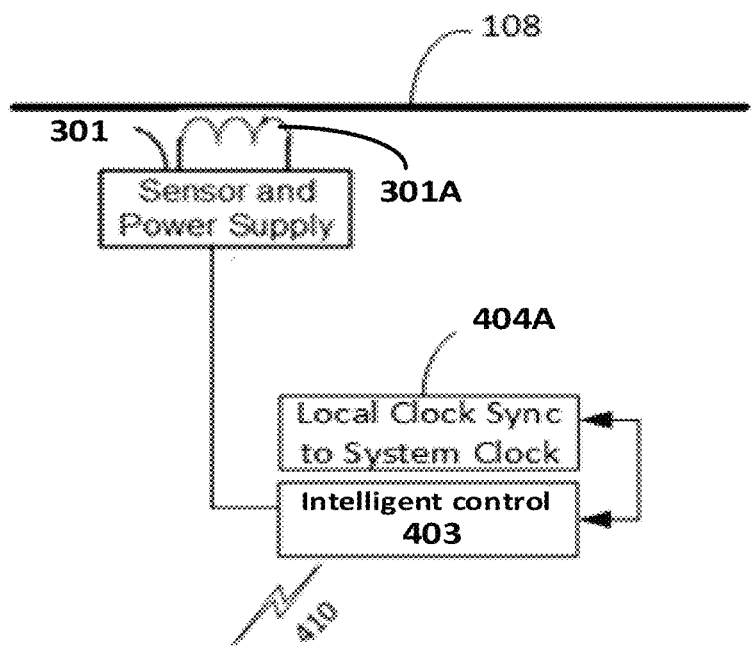
FIG. 3A is a circuit diagram illustrating a local master control module of a TL-FACTS based IIU having an associated local clock according to one embodiment.
Figure 3B:
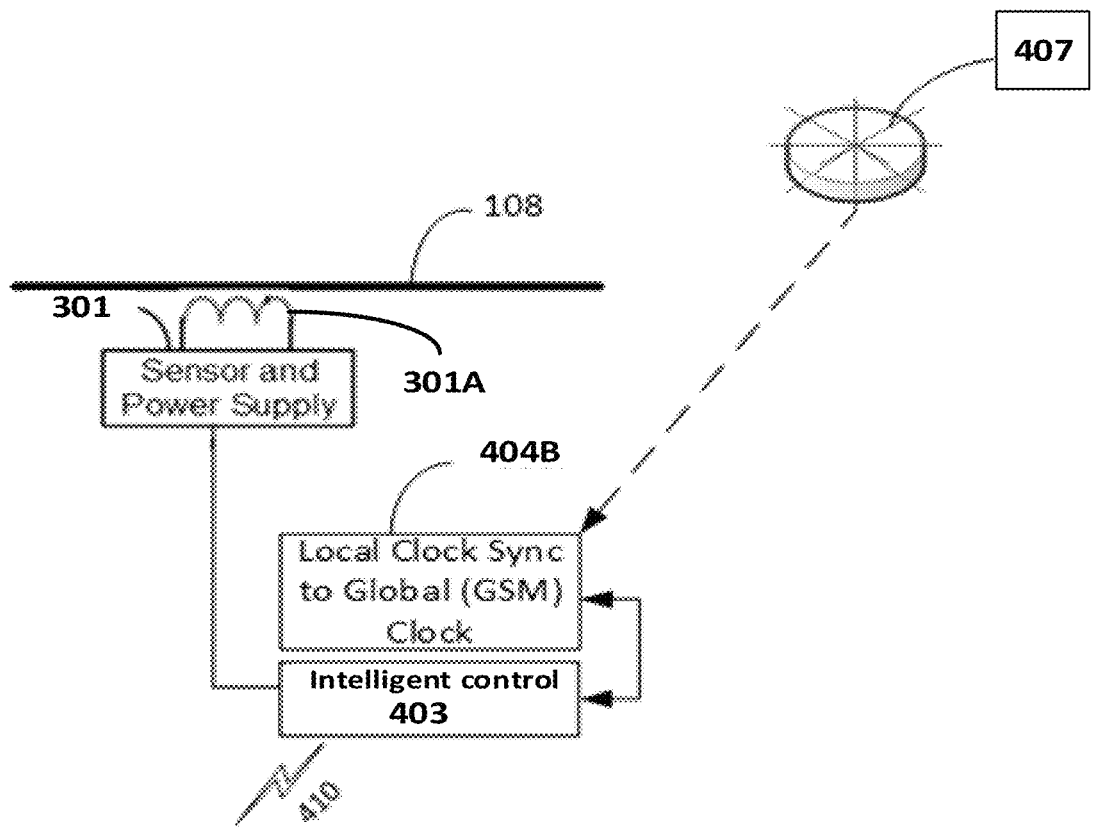
FIG. 3B is a circuit diagram illustrating a local master control module of a TL-FACTS based IIU having an associated local clock that can be synchronized to a global clock according to one embodiment.

FIG. 3A shows use of a local clock 404A coupled to an intelligent control module 403 within each IIM to synchronize the generation and injection of impedance on to the power line 108. The FIG. 3B shows use of a global clock 404B controlled typically by the GPS 407, coupled to an intelligent control module 403 to synchronize the generation and injection of impedance on to the power line 108. The IIM 300 uses power extracted from the HV transmission line 108 using a power transformer 301A coupled to a sensor and power supply module 301 to provide the power to the circuits of the IIM 300 including the intelligent control unit 403, communication unit 410 and the IIUs 400.

Figure 4:
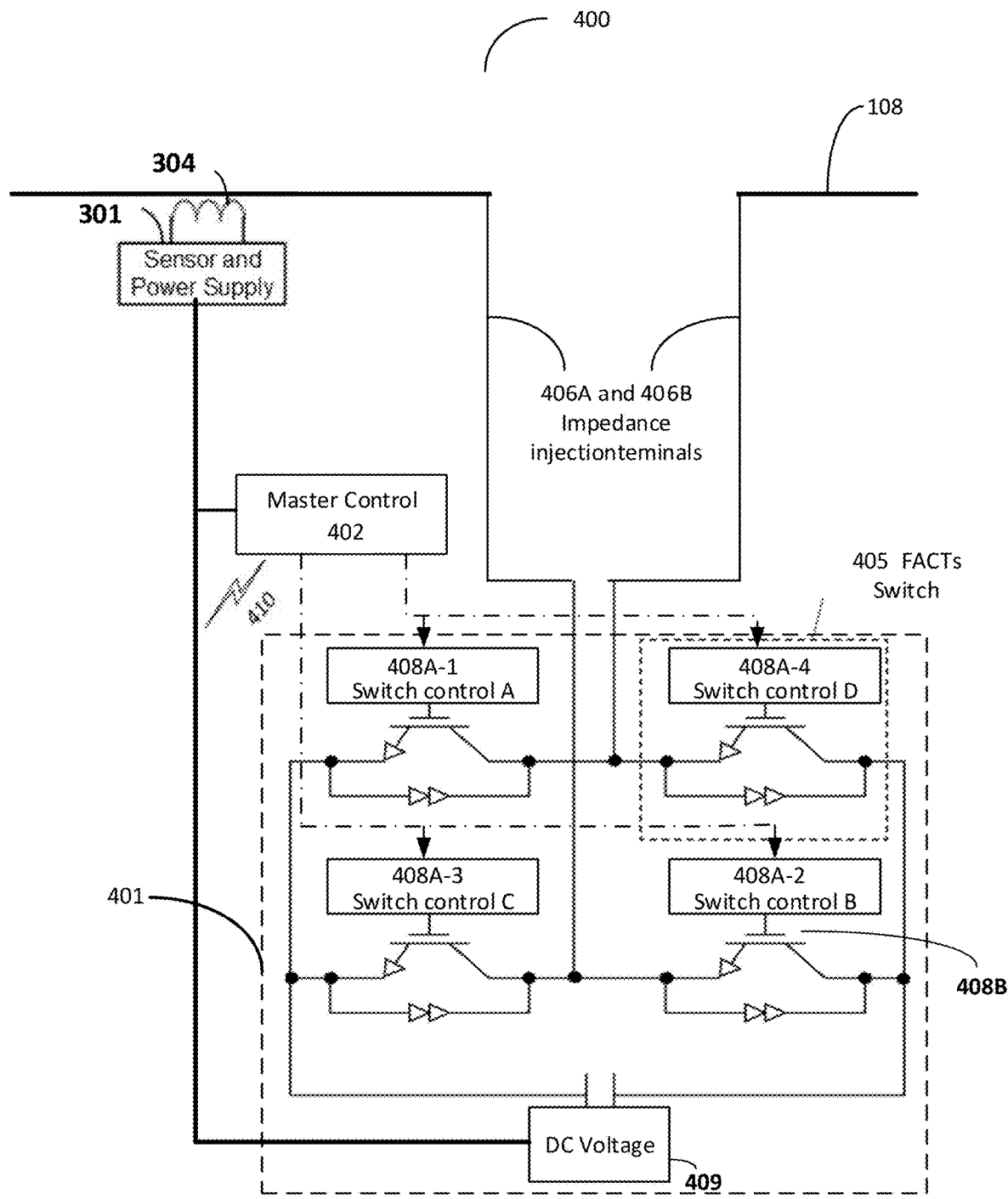
FIG. 4 is a circuit diagram illustrating an example of a transformer-less flexible alternating current (AC) transmission system (TL-FACTS) based impedance injection unit (IIU), where one or more IIUs may constitute an impedance injection module IIM 300.

FIG. 4 shows an example circuit diagram of a transformer-less flexible alternating current transmission system (TL-FACTS) based impedance injection unit (IIU) 400 connected in series on the HV transmission line. The IIU 400 is capable of generating inductive or capacitive impedance to be injected on to the power line 108. The IIU 400 comprise two leads 406A and 406B that are connected in series with the HV Transmission line 108. Four insulated-gate bipolar transistor (IGBT) switches 408B are used to connect the input line, lead 406A to the output line, lead 406B. The switching of the four IGBT switches 408B are controlled by switch controls 408A-1 to 408A-4 that are coupled to a master control 402. The master control, for example intelligent control capability 402 of FIG. 2, is coupled to a sensor and power supply module 301, which extracts power from the HV transmission line 108 for the operation of the ITU 400 via the transformer 304. A DC capacitor develops a DC voltage across itself that is used as injected impedance into the HV power line 108. Depending on the sequence of switching of the IGBT switches 408B an inductive or capacitive impedance can be generated and injected on to the HV transmission line 108. Typically, an IIM 300 comprise a number of IIUs 400 that are connected in a series-parallel configuration.

Figure 5:
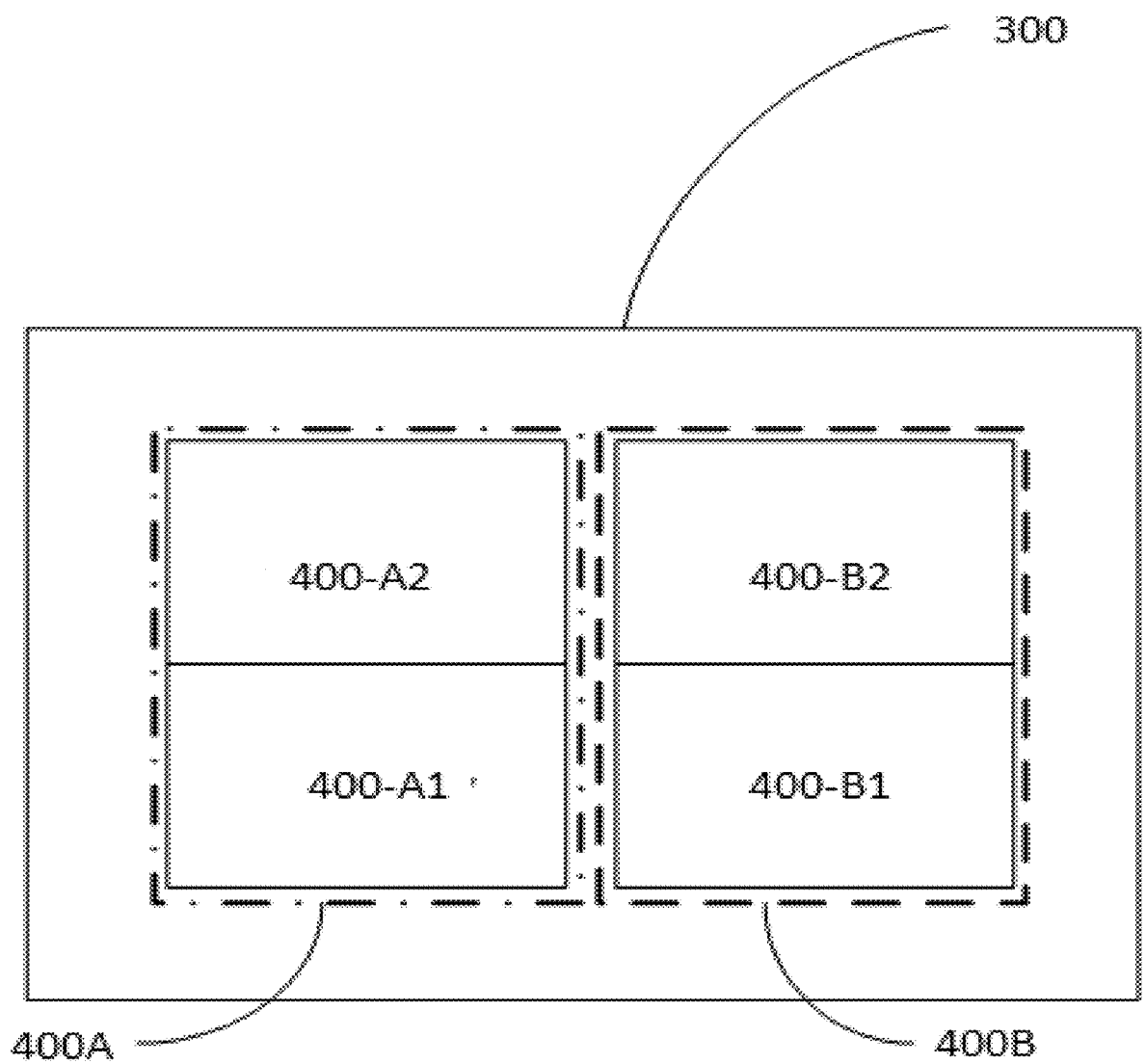
FIG. 5 is an example block diagram illustrating an IIM having a 2×2 series-parallel connection comprising four TL-FACTS based ITUs according to one embodiment.

FIG. 5 shows an IIM 300 having a 2×2 configuration of IIUs 400. The IGBT switches of the IIUs are enabled to switch to generate rectangular impedance waveforms which get injected on to the HV transmission line. IGBT switches 408B have to be de-rated during application for their current carrying capacity to improve reliability, in some embodiments. IGBT paralleling within IIUs 400 and multiple IIU paralleling with switch synchronization in each IIM 300 are used to ensure adequate current capability through the IIMs 300 connected in series with the line. The paralleled groups of IIU 400 may be connected in series within each IIM 300 to increase the generated and injected impedance voltage from the IIM 300. The result of such a connection configuration is to increase both the current carrying capacity and the generated injected impedance voltage from the IIM 300.

The injected waveforms from the series connected IIUs 400 groups, 400A and 400B are additive and make up a rectangular impedance injection waveform of typically double the amplitude if the start and stop times are synchronized. Such a large amplitude rectangular injection on to the HV transmission line 108 may result in oscillations being initiated and harmonics being injected on the HV transmission line 108. It will be ideal if such oscillations and harmonic injections are avoided on the HV transmission lines of the grid for improved stability and reliability of operation of the power grid. This can be accomplished by staggering the impedance injection from various series connected IIUs 400 or groups of parallel connected IIUs 400 where the groups are connected in series.

In some cases, individual capability of a single IIM 300 is insufficient to provide the impedance injection required. The resources from multiple distributed IIMs 300s which are connected in series on the HV power grid may be utilized to generate the total impedance injection needed. Staggering of start and stop times (or duration of injection) is needed in these cases to limit oscillations and injection of harmonics on the HV transmission line. Use of the synchronizable clock across IIMs 300 enables such staggering of injected waveforms within an IIM 300 and/or between IIMs 300 by modifying the start and end times of the series connected IIU 400 groups, the IIU 400 groups being IIUs 400s connected in parallel and switched simultaneously as previously discussed.

In certain instances, the HV transmission lines can experience sudden disturbances which may be local in nature. It will be ideal if responsive action can be initiated in the sensed local region to remedy such disturbances and limit their spread.

Figure 6:
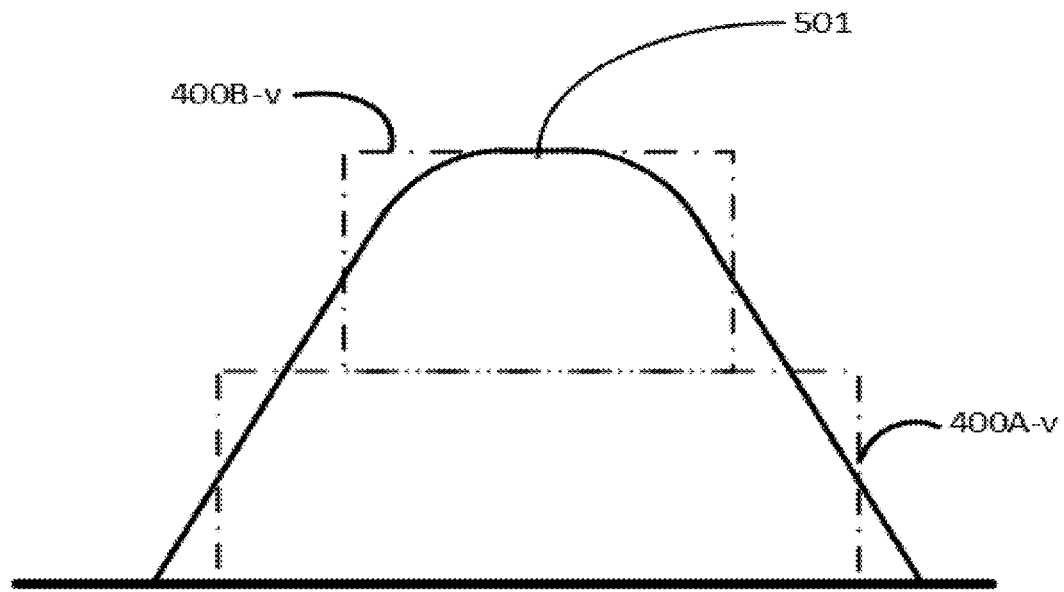
FIG. 6 is an example illustrative diagram of the IIM having two sets of parallel connected TL-FACTS based IIUs interconnected in series. A 2×2 Matrix of FIG. 5 providing two rectangular waveforms from the two sets of series connected IIUs 400 in a synchronized fashion that when combined, generate a pseudo-sinusoidal wave for injection on to the HV transmission line.
Figure 6A:
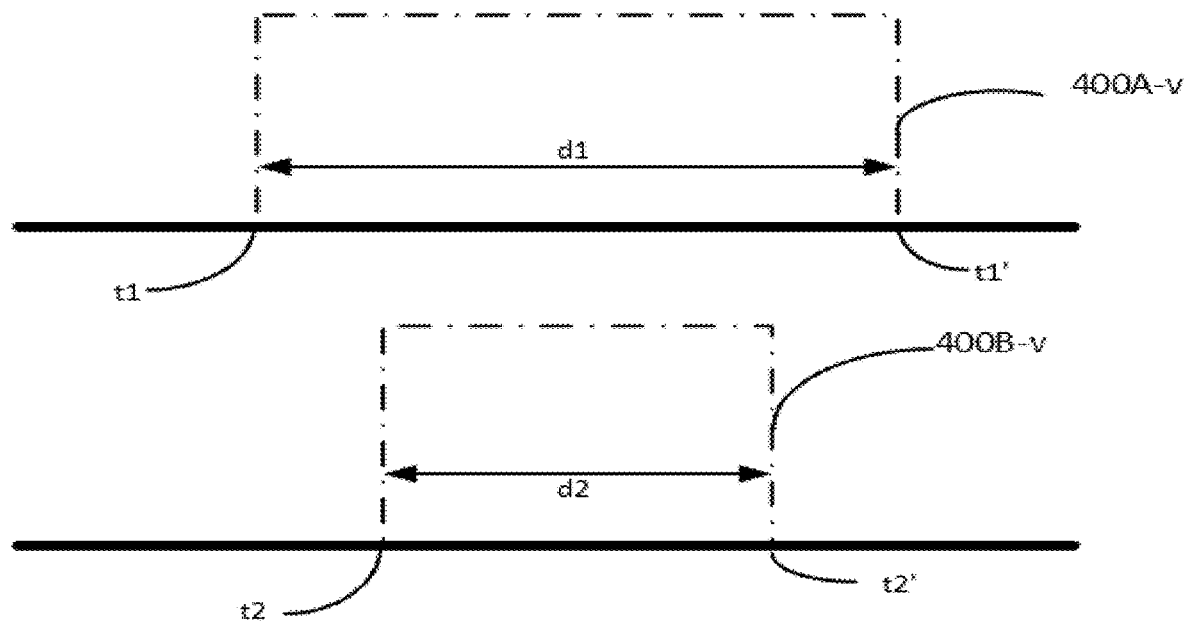
FIG. 6A shows the synchronously-generated and injected rectangular waves from each of the two series connected groups of two parallel connected ITUs of the IIM 300 of FIG. 5.

It is optimum if the generated waveforms from the IIUs 400 of the IIM 300 can be adjusted to represent a pseudo-sinusoidal impedance waveform when cumulatively injected on to the HV transmission line 108. IIM 300 may comprise one or more IIUs 400 that are connected in series, parallel or series-parallel connections. A set of start-time-synchronized and duration-adjusted waveforms generated by four IIUs 400s connected in a 2×2 array of FIG. 5 is shown in FIG. 6. The 2×2-connected array of IIUs 400 of the example IIM 300 comprise four IIUs, the first two IIUs 400-A1 and 400-A2 forming a parallel-connected group 400A and the second two IIUs 400-B1 and 400-B2 forming a second parallel-connected group 400-B. The waveforms generated by each of the parallel connected IIUs of a group are synchronized to start, end and have same amplitude. The two parallel connected groups 400A and 400B are connected in series to form the example implementation of the IIM 300 of FIG. 5. The IIM 300 of FIG. 5 is able to generate impedance injection waveforms 400A-$v$ and 400B-$v$ as shown in Fig.6A, the waveform 400A-$v$ having a start at time t1 and an end time t1' with a duration d1, and the waveform 400B-$v$ having a start time at t2 and an end time t2' wherein the duration is d2 which is less than d1. The two waveforms are cumulative when injected onto the HV transmission line as the two parallel connected IIU groups 400A and 400B are in series and typically will smooth out to the sinusoidal waveform 501 shown in FIG. 6.

Figure 7:
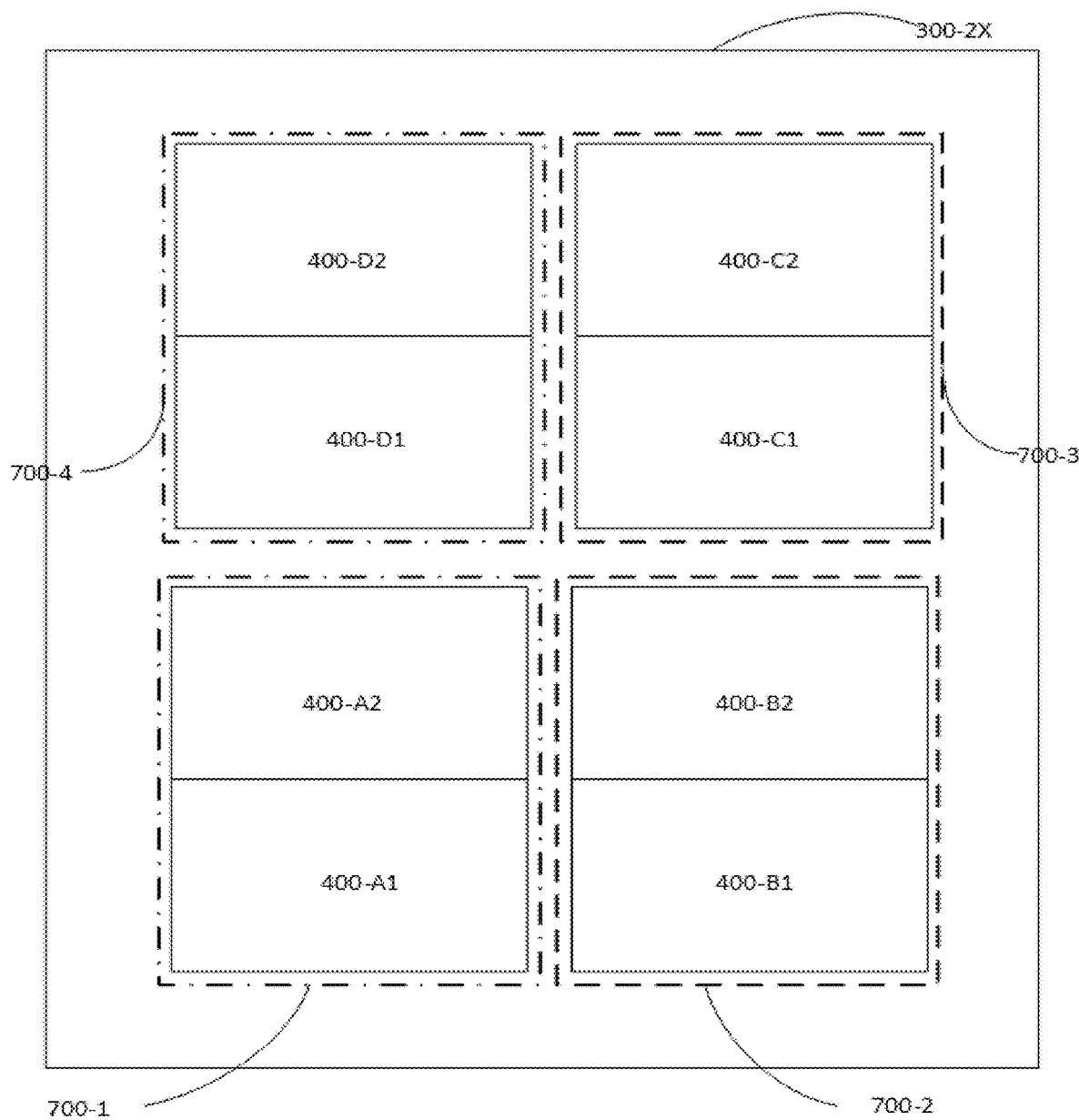
FIG. 7 shows an 8 IIUs configured in four parallel groups, each group having two IIUs in parallel and the four groups connected in series to form an IIM.
Figure 7A:
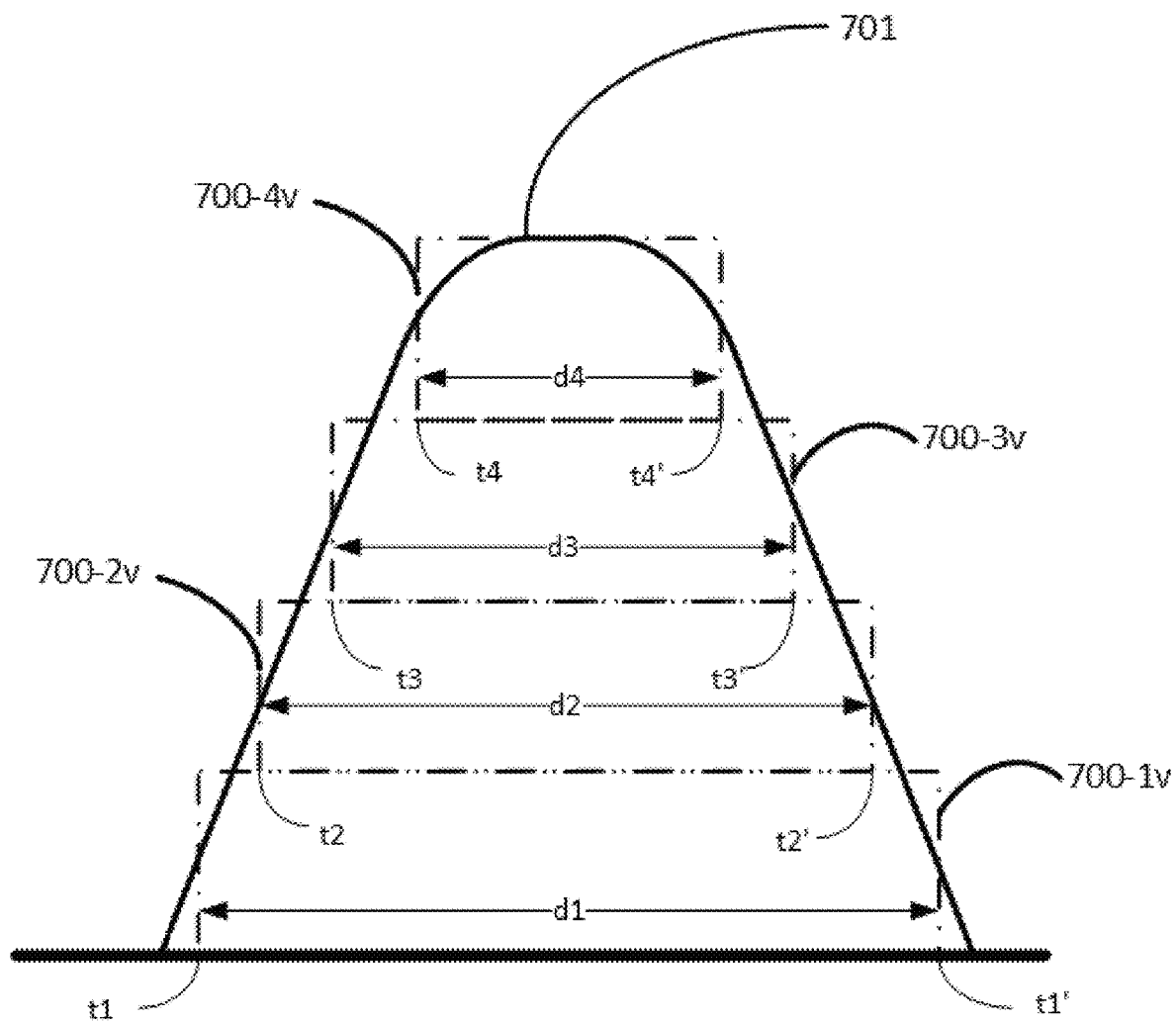
FIG. 7A shows the injected output from the four groups of dual IIUs of FIG. 7 with their injection start and end times adjusted in a synchronized fashion to generate a pseudo-sinusoidal waveform that smooths to a sinusoidal waveform 701 when injected on the HV transmission line.

FIG. 7 shows another example IIM 300-2X comprising a 4×2 combination, four groups of two IIUs 400 in parallel, the four groups are connected in series to form an IIM 300-2X. That is, each of the four groups 700-1 to 700-4 are formed by paralleling two IIUs 400. Group 700-1 comprising IIUs 400-A1 and A2, group 700-2 comprising IIU 400-301B1 and B2, 700-3 comprising IIUs 400-C1 and C2, the group 700-4 comprising IIU 400-D1 and D2. The four parallel-connected groups of IIUs 700-1 to 700-4 are connected in series to generate impedances 700-1$v$ to 700-4$v$ to be injected on to the HV transmission line 108. The individually injected impedances 700-1$v$ to 700-4$v$ have start times staggered as t1, t2, t3 and t4 with end times staggered as t1', t2', t3' and t4' providing injection durations d1, d2, d3 and d4 respectively, as shown in FIG. 7A. These impedances, when injected onto the HV transmission line, cumulatively combine to provide a pseudo-sinusoidal waveform which gets smoothed to the sinusoidal waveform 701 due to the impedance of the line as shown in FIG. 7A.

Considering FIGS. 7 and 7A, it is clear that the impedance generation capabilities of all the groups of IIUs 700-1 to 700-4 of the IIM 300-2X are not fully used in generating the impedance for injection on to the HV transmission line. In one embodiment, it is assumed that all of the IIUs groups 700-1 to 700-4 of the IIM 300-2X have equal capabilities for generation of impedance waveforms, as shown in FIG. 7A. The IIU group 700-1 injects the rectangular waveform 700-1$v$ having a start time t1, a duration d1, and an end time at t1'. Furthermore, IIU 700-2 is constrained to inject a waveform 700-2$v$ starting at a later time t2 having a duration d2 that ends at t2' before the 700-1$v$ t1' ends. Similar conditions are repeated for IIU group 700-3 and IIU group 700-4, resulting in each of the IIU groups that start later ends earlier with smaller and smaller duration. Hence the later starting groups of IIUs have larger and larger unused capacity as clearly shown in FIG. 7A.

A sudden disturbance or a local disturbance that happens on the HV transmission line can require an injection of inductive or capacitive impedances as corrective action. This corrective action can be accomplished within the same injection cycle by generating short duration pulses by the IIU groups 700 with their available unutilized time. The sudden or local disturbance is sensed by the sensors coupled to the IIM 300-2X or alternately sensors distributed over the HV transmission line. The IIM 300-2X of the local area receives the sensed data, and using the intelligence built into it, develops an impedance injection response to the disturbance by taking into account the available resources including the unused capacity of the groups of IIUs 700 of the IIM 300-2X.

Figure 8A:
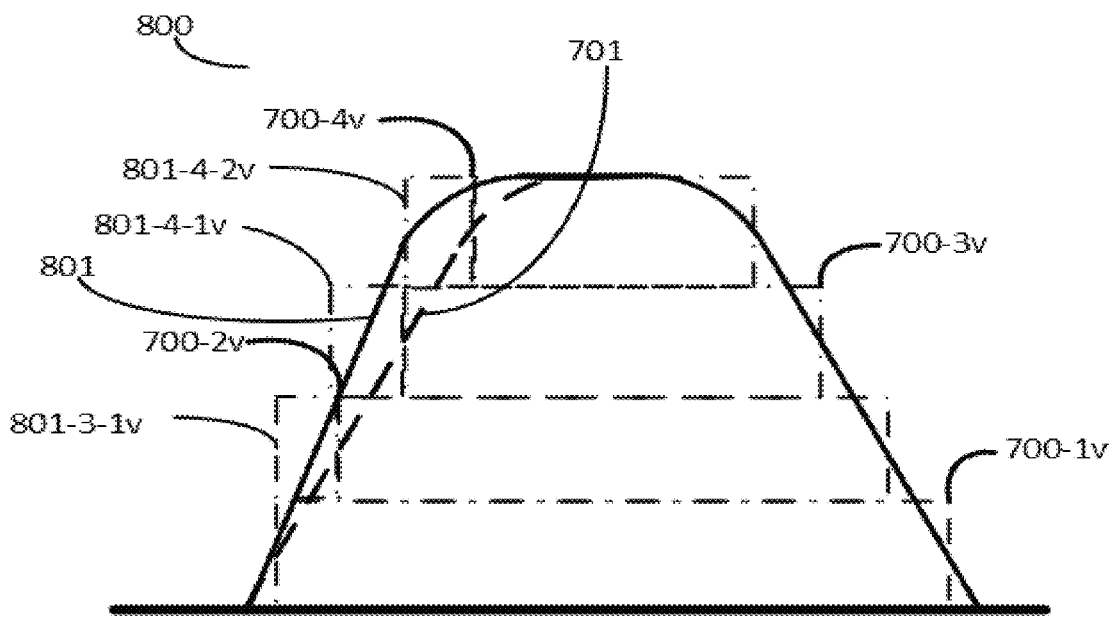
FIG. 8A is an example illustrative diagram 800 of the use of the un-utilized capability of the IIUs of the IIM in FIG. 7. Diagram 800 shows injecting additional rectangular waveforms to modify the pseudo- sinusoidal waveform 701 of FIG. 7A. This injection results in a modified waveform which is smoothed to waveform 801. The smoothed waveform addresses managing unexpected problems on the HV transmission line.
Figure 8:
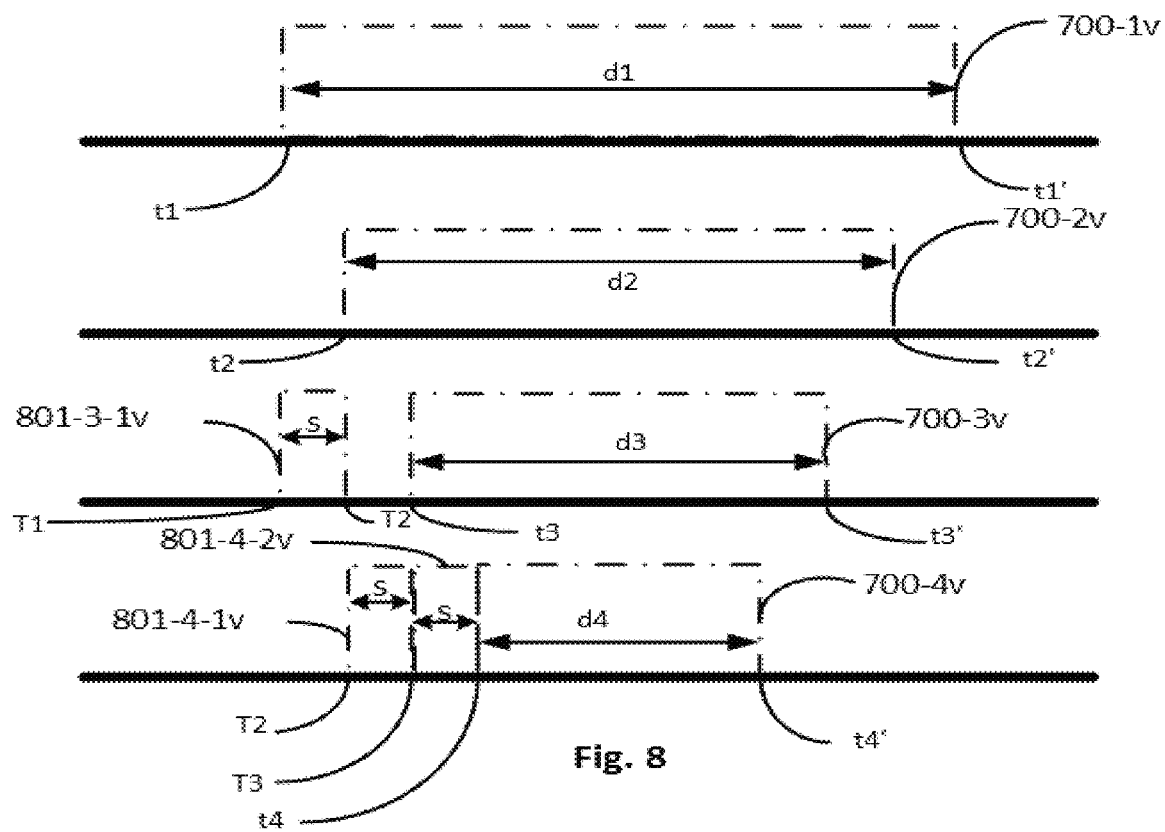
FIG. 8 shows the synchronously injected waveforms from each of the four IIUs of the IIM that enable the modified injected waveform of FIG. 7.

The response defines the generation and injection of additional short duration pulses of duration 's', shown in FIG. 8, during the unutilized IIU groups' 700 available time. The additional short duration pulses are synchronized with the normally injected impedance pulses using the local or global clock used by the IIM 300-2X generating the short pulses. These short-duration pulses are used to amend or modify the normally injected impedance injection waveform 701 to the example modified waveform 801 to address the sudden or local disturbance identified on the HV transmission line.

FIGS. 8 and 8A show the example short-pulse generation and injection of these short-duration pulses during the unused times of the groups of IIU 700. FIG. 8 shows the short-duration pulse 801-3-1v having a start time synchronized to t1 and duration 's' generated and injected by IIU group 700-3 and also the additional short pulses 801-4-1v having a start time at t2 and duration 's' and 801-4-2v having a start time t3 and duration 's' being generated by IIU group 700-4 which when cumulatively injected with the regular injected waveforms 700-1v to 700-4v modify the original injected and smoothed impedance waveform 701 to a modified smoothed waveform 801 to be injected on to the HV transmission line 108 to overcome the sudden or local disturbance that was sensed on the HV transmission line 108.

As discussed previously, the additional pulses generated and injected can be either inductive or capacitive depending on the disturbance sensed and the response identified by the TIM 300-2X. Though the short pulses are shown as having a fixed duration, it is not necessary to have it so. The short pulses can have any duration without encroaching on the existing impedance injection waveform from the group of IIUs 400. Similarly, the amplitude of the short pulses and the injected impedance waveform are shown as being equal in magnitude from each of the groups of IIUs. The equal magnitude injection is not always necessary or optimum. The amplitudes of injected waveform can be different from different switch groups and the amplitudes and timing can be optimized to respond to any line balancing, flow control or disturbance correction needs within the injection capability of the group of IIUs.

Even though the invention disclosed is described using specific implementations as examples, it is intended only to be examples and non-limiting. The practitioners of the art will be able to understand and modify the same based on new innovations and concepts, as they are made and become available. The invention is intended to encompass these modifications that conform to the inventive ideas discussed.

What is claimed is:

1. A method of operating an impedance injection module (IIM) comprising a plurality of flexible alternating current transmission system (FACTS) based impedance injection units (IIUs), the method comprising:
    controlling, by a control module of the IIM, the plurality of FACTS based IIUs of the IIM forming multiple connection configurations in sequence, each connection configuration comprising multiple FACTS based IIUs in series, parallel or combination thereof, wherein the IIM is coupled to a transmission line;
    generating, by the plurality of FACTS based IIUs through the multiple connection configurations, a plurality of synchronized rectangular impedance injection waveforms that, when injected into the transmission line, are combined to produce a pseudo-sinusoidal impedance waveform;
    injecting the generated synchronized rectangular impedance injection waveforms into the transmission line and controlling power flow in the transmission line using the pseudo-sinusoidal impedance waveform; and
    generating and injecting into the transmission line one or more short duration pulses by at least one FACTS based IIU that is not being utilized during that period of generating the synchronized rectangular impedance injection waveforms.

2. The method of claim 1, further comprising:
    sensing, by a plurality of sensors coupled to the transmission line, presence of a disturbance on the transmission line; and
    combining the one or more short duration pulses with the plurality of synchronized rectangular impedance injection waveforms to modify the produced pseudo-sinusoidal impedance waveform to rectify the sensed disturbance.

3. The method of claim 1, wherein the pseudo-sinusoidal impedance waveform reduces generation of oscillations on the transmission line, as compared to injection of a single rectangular impedance injection waveform into the transmission line.

4. The method of claim 1, wherein the plurality of synchronized rectangular impedance injection waveforms are synchronized to generate a sequence of rectangular waveforms that when combined and injected into the transmission line, produces the pseudo-sinusoidal impedance waveform.

5. The method of claim 1, further comprising:
    synchronizing, through a communication unit, the controlling of the plurality of FACTS based IIUs of the TIM and the generating of the plurality of synchronized rectangular impedance injection waveforms with one or more clocks that are local to the control module and the plurality of FACTS based IIUs.

6. The method of claim 1, further comprising:
    synchronizing one or more clocks that are local to the control module and the plurality of FACTS based IIUs, to a Global Positioning System (GPS) clock.

7. The method of claim 1, further comprising:
    generating one or more additional pulses of shorter duration than the sequence, wherein when the one or more additional pulses are combined with the synchronized rectangular impedance injection waveforms and injected into the transmission line, by the control module through one or more of the plurality of FACTS based IIUs not otherwise being used during that period that produces the pseudo-sinusoidal impedance waveform, the pseudo-sinusoidal waveform is modified in response to the sensed presence of the disturbance.

8. The method of claim 1, further comprising:
generating and injecting one or more additional pulses to the transmission line, by the control module through the plurality of FACTS based IIUs during their unused periods, to respond to and correct the disturbance on the transmission line.

9. An impedance injection system comprising one or more impedance injection modules (IIMs), the impedance injection system comprising:
a plurality of flexible alternating current transmission system (FACTS) based impedance injection units (IIUs) of an IIM; and
a control module to:
direct the plurality of FACTS based IIUs of the IIM to form connection configurations in sequence, with each connection configuration comprising multiple FACTS based IIUs connected in series, parallel or combination thereof, wherein the IIM is coupled to a transmission line;
generate, through the connection configurations of the plurality of FACTS based IIUs in the sequence, synchronized rectangular impedance injection waveforms to combine and inject into the transmission line, to produce a pseudo-sinusoidal impedance waveform on the transmission line, to control power flow in the transmission line; and
generate, through the connection configurations of one or more of the plurality of FACTS based IIUs, during an unused period in the sequence, one or more short duration pulses to be combined with the synchronized rectangular impedance injection waveforms and injected into the transmission line to correct a sensed disturbance on the transmission line.

10. The impedance injection system of claim 9, wherein the control module further to smooth the synchronized rectangular impedance injection waveforms to produce the pseudo-sinusoidal impedance waveform to reduce generation of oscillations on the transmission line in comparison to injection of a single rectangular impedance injection waveform into the transmission line.

11. The impedance injection system of claim 9, further comprising the control module to synchronize the rectangular impedance injection waveforms to the sequence of connection configurations of the FACTS based IIUs.

12. The impedance injection system of claim 9, further comprising:
a communication unit configured to synchronize the connection configurations and the rectangular impedance injection waveforms with one or more clocks that are local to the control module and the plurality of FACTS based IIUs.

13. The impedance injection system of claim 9, further comprising:
a communication unit configured to synchronize one or more clocks that are local to the control module and the plurality of FACTS based IIUs, to a Global Positioning System (GPS) clock.

14. The impedance injection system of claim 9, further comprising:
one or more sensors, for connection to the transmission line; and
the control module to generate and inject, through one or more FACTS based IIUs that are not at that time being used in the connection configurations in the sequence, one or more additional pulses of shorter duration than the sequence, into the transmission line, the injected one or more additional pulses to modify the pseudo-sinusoidal impedance waveform in response to sensing a disturbance by the one or more sensors on the transmission line, wherein the modification of the pseudo-sinusoidal impedance waveform is configured as a correction for the sensed disturbance.

15. The impedance injection system of claim 9, further comprising:
the control module configured to generate and inject, through the plurality of FACTS based IIUs, one or more additional short pulses into the transmission line, to respond to and correct a disturbance on the transmission line.

16. A non-transitory, computer-readable media having instructions therein, which when executed by a processor, cause the processor to:
direct a plurality of flexible alternating current transmission system (FACTS) based impedance injection units (IIUs) of an impedance injection module (IIM) to form connection configurations in sequence, with each connection configuration comprising multiple IIUs connected in series, parallel or combination thereof, wherein the IIM is coupled to a transmission line;
generate, through the connection configurations of FACTS based IIUs in the sequence, synchronized rectangular impedance injection waveforms to combine and inject into the transmission line, to produce a pseudo-sinusoidal impedance waveform on the transmission line to control power flow in the transmission line; and
generate, through the connection configurations of FACTS based IIUs, during an unused period in the sequence, one or more short duration pulses to be injected into the transmission line to correct a sensed disturbance on the transmission line.

17. The non-transitory, computer-readable media of claim 16, wherein the instructions, which when executed by the processor, further cause the processor to:
synchronize the rectangular impedance injection waveforms to the sequence of connection configurations of FACTS based IIUs.

18. The non-transitory, computer-readable media of claim 16, wherein the instructions, which when executed by the processor, further cause the processor to:
synchronize the connection configurations and the rectangular impedance injection waveforms with one or more clocks that are local to a control module and the plurality of FACTS based IIUs.

19. The non-transitory, computer-readable media of claim 16, wherein the instructions, which when executed by the processor, further cause the processor to:
synchronize one or more clocks that are local to a control module and the plurality of FACTS based IIUs, to a Global Positioning System (GPS) clock.

20. The non-transitory, computer-readable media of claim 16, wherein the instructions, which when executed by the processor, further cause the processor to:
sense a disturbance on the transmission line through one or more sensors; and
generate and inject, through one or more FACTS based IIUs that are not at that moment being used in the connection configurations in the sequence, one or more additional pulses of shorter duration than the sequence, into the transmission line, to modify the pseudo-sinusoidal impedance waveform, in response to sensing the disturbance on the transmission line.

21. The non-transitory, computer-readable media of claim 16, wherein the instructions, which when executed by the processor, further cause the processor to:

generate and inject, through the plurality of FACTS based IIUs, one or more additional short duration pulses to the transmission line, to respond to and correct a disturbance on the transmission line.

* * * * *